United States Patent
Bowie

Patent Number: 5,956,323
Date of Patent: Sep. 21, 1999

[54] POWER CONSERVATION FOR POTS AND MODULATED DATA TRANSMISSION

[75] Inventor: Bruce H. Bowie, Santa Rose, Calif.

[73] Assignee: Nokia High Speed Access Products Inc., Petaluma, Calif.

[21] Appl. No.: 08/903,504

[22] Filed: Jul. 30, 1997

[51] Int. Cl.[6] .......................... H04M 11/00; H04Q 1/00
[52] U.S. Cl. .......................... 370/241; 379/413
[58] Field of Search ..................... 370/216, 241, 370/242, 244, 249, 250, 251, 204, 205, 212, 213; 379/1, 2, 5, 9, 15, 23, 26, 27, 32, 93.06, 399, 412, 413, 377

[56] References Cited

U.S. PATENT DOCUMENTS

| | | | |
|---|---|---|---|
| 4,484,028 | 11/1984 | Kelley et al. | 379/93.14 |
| 4,979,208 | 12/1990 | Pruden et al. | 379/145 |
| 5,483,574 | 1/1996 | Yuyama | 379/32 |
| 5,590,396 | 12/1996 | Henry | 455/426 |
| 5,742,527 | 4/1998 | Rybicki et al. | 364/705.05 |
| 5,799,064 | 8/1998 | Sridhar et al. | 375/222 |

Primary Examiner—Chi H. Pham
Assistant Examiner—Kwang B. Yao
Attorney, Agent, or Firm—Fish & Richardson P.C.

[57] ABSTRACT

Methods and apparatus for conserving power in terminal units that transmit and receive modulated data over a communications loop that is shared with voiceband telephone equipment are disclosed. The methods include monitoring the loop to detect a shut-down condition and reducing power consumption of certain of the electronic circuits in the terminal unit upon detection of a shut-down condition. The methods also include monitoring the loop with a monitoring circuit to detect a resume signal outside the voiceband frequency range on the loop and restoring power to the electronic circuits when the resume signal is detected. The apparatuses include a modulated data transmitting and receiving unit having a connector for coupling the unit to a communications loop, circuitry to transmit and receive a modulated data signal in a frequency range above voiceband, and circuitry to detect a resume signal in the frequency range above voiceband and then to initiate a power up sequence for the transmit and receive circuitry.

27 Claims, 3 Drawing Sheets

POWER CONSERVATION FOR POTS AND MODULATED DATA TRANSMISSION

The present invention is directed to a power conservation system for modulated data communications, and more particularly to a power conservation system for transmission systems in which data is modulated over a communications loop from a central office location to a customer premises.

BACKGROUND

Wire loops extending from a telephone company central office to a customer premises are a ubiquitous part of the existing communications infrastructure. These wire loops form a communications network often referred to as the plain old telephone service' (POTS) network. The POTS network originated to support analog voice phone service.

The POTS network currently supports a wide range of communications services in addition to analog voice phone calls. These services include digital data transmissions from facsimile (FAX) machines and computer modems. Voice calls, FAX connections, and computer modem transmissions all operate within the frequency spectrum of traditional POTS calls, thus ensuring compatibility with the existing wire loop infrastructure and allowing transport of these services end-to-end through the POTS phone network. However, the use of POTS-compatible transmission frequencies severely limits the maximum information carrying capacity of the wire loop.

Certain transmission technologies may use carrier frequencies greater than those required for POTS services to exceed the information capacity limits of POTS calls over wire loops. However, since the existing POTS loop infrastructure was not designed for carrying such high frequency signals, severe impediments to such transmission exist. In particular, as a result of electromagnetic coupling among wire loops, electromagnetic noise signals are induced on the loops. This electromagnetic coupling may occur among the large number of loops in the wire bundles that extend from the central office to various customer distribution points.

Noise signals induced on the loops by electromagnetic coupling may not be perceptible on POTS voice calls. However, such signals may significantly interfere with wide-bandwidth modulated data transmissions that use high frequency signals. To reduce interference problems, sophisticated signal processing circuitry, such as digital signal processors (DSPs), are used within modulated data receiver and transmitter units to remove noise, to encode and decode desired signals, and to perform error correction functions.

To minimize the number of wire loops needed to service a customer's premises, POTS signals and modulated data transmission signals may be combined on a single wire loop. To combine POTS and wide-bandwidth modulated data transmission signals, the wide-bandwidth modulated data is transported using frequencies (spectrum) greater than those of POTS services. This spectrum usage allows a POTS service connection to be supported by its traditionally allocated spectrum while simultaneously supporting high frequency modulated data transmission. Thus, current technology permits POTS and high bandwidth data may be carried between customer premise equipment (CPE) and a central office (CO) on a single wire loop. At the central office, the POTS signal frequencies are separated from the high frequency data signal; the POTS signal is then handled by the existing POTS switch and network, while the high frequency spectrum is directed to separate processing components.

Signal processing, transmitting, and receiving circuitry for such high frequency modulated data signals requires a substantial amounts of power, typically up to 5 watts per loop served. For a large central office, potentially serving many thousands of such data connections, this power usage is substantial.

SUMMARY

In general, in one aspect, the invention features a method of conserving power in a terminal unit having a transmitter and receiver for modulated data communication over a communications loop that is shared with voiceband telephone equipment. The method includes monitoring the loop to detect a shut-down condition, reducing power consumption of certain of the electronic circuits in the terminal unit upon detection of a shut-down condition, monitoring the loop with a monitoring circuit to detect a resume signal outside the voiceband frequency range on the loop, and restoring power to the electronic circuits when the resume signal is detected.

Implementations of the invention may include one or more of the following features. The modulated data may be a bit stream including framing information, and a shut-down condition may be indicated by a loss of framing information. The modulated data may include a signaling channel and a shut down condition may be indicated by bits transmitted in the signaling channel. The resume signal may be an AC signal at a frequency above voiceband, such as a 16 kHz AC signal.

In general, in another aspect, the invention features a modulated data transmitting and receiving unit. The unit includes a connector for coupling the unit to a communications loop, circuitry to transmit and receive a modulated data signal in a frequency range above voiceband, and circuitry to detect a resume signal in the frequency range above voiceband and then to initiate a power up sequence for the transmit and receive circuitry.

Implementations of the invention may include one or more of the following features. The connector may be a two-wire connector. The transmit and receive circuitry may include Asymmetric Digital Subscriber Line transmit and receive circuitry. The resume signal detection circuitry may be a 16 kHz frequency detector. The communications loop may be a wireless communications loop. The resume signal may be an AC signal greater than 4 kHz or may be a multi-tone AC signal. The unit may also include a control signal interface to receive a start-up signal, and circuitry to transmit a resume signal upon receipt of the start-up signal.

In general, in another aspect, the invention features a modulated data transmitting and receiving unit. The unit includes a connector for coupling the unit to a communications loop, a control signal interface for receiving a start-up signal, circuitry to transmit and receive a modulated data signal at frequencies above voiceband, and circuitry to transmit a resume signal on the loop upon receipt of a start-up signal on the control signal interface.

Implementations of the invention may include one or more of the following features. The communications loop may a wireless loop. The control signal interface may be a data interface, such as a peripheral component interconnect (PCI) interface. The start-up signal may be indicated by receipt of data on the control signal interface. The control signal interface may be used for the exchange of both the start-up signal and of data between the modulated data transmitting and receiving unit and customer premise equipment.

Among the advantages of the invention are the following. Modulated data signal processing, transmitting, and receiving circuitry can be placed in a low power state when inactive, and then re-energized to resume full power operation as needed. Central office terminals (COTs) and customer premises equipment (CPE) units can exchange shutdown and resume signals without interfering with POTS services on the wire loop. Additionally, either a CPE or a COT unit can initiate both a low power state and resumption to a full power state.

DETAILED DESCRIPTION

Asymmetric Digital Subscriber Line (ADSL) technology is used to transmit wide-bandwidth modulated data over a two-wire loop using high frequency carrier signals. ADSL allows a two-wire loop to simultaneously transport POTS analog voice phone services along with high speed modulated digital data over wire loops of up to 18,000 feet. This simultaneous support of POTS and modulated digital services is provided by transporting POTS services using their traditionally allocated spectrum while transporting modulated digital data using spectrum outside of the POTS range.

Figure 1:
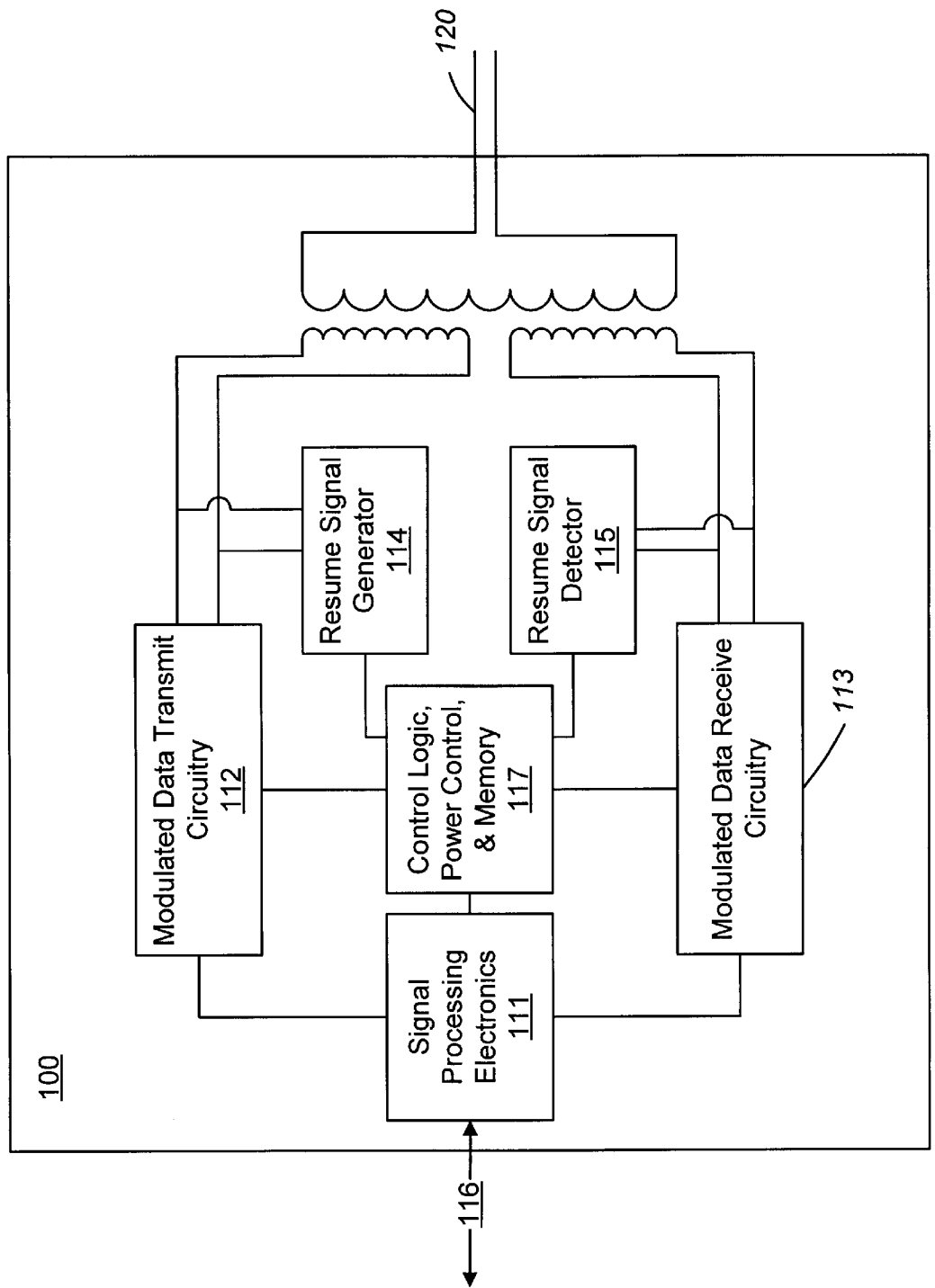
FIG. 1 is a block diagram of an ADSL unit in accordance with the invention.

FIG. 1 is a block diagram of an ADSL unit. To send and receive modulated digital data, the ADSL unit 100 employs high speed signal processing electronics 111 that includes, for example, digital signal processing (DSP) circuitry. Signal processing electronics 111 eliminate stray electronic noise induced on the two-wire loop 120 and, along with transmit circuitry 112 and receive circuitry 113, are used to send and receive modulated data. In addition, signal processing circuitry 111 may implement error correcting algorithms, such as the Reed-Solomon algorithm, to further reduce data errors that arise during transmission. The signal processing, transmit, and receive functions may be provided by, for example, a Motorola CopperGold chip set or a GlobeSpan Technologies STAR or SLADE chip set. Control circuitry 117 is provided to control operation of the ADSL unit 100, to control power usage by ADSL unit circuitry, and for storage of ADSL unit parameters.

Figure 2:
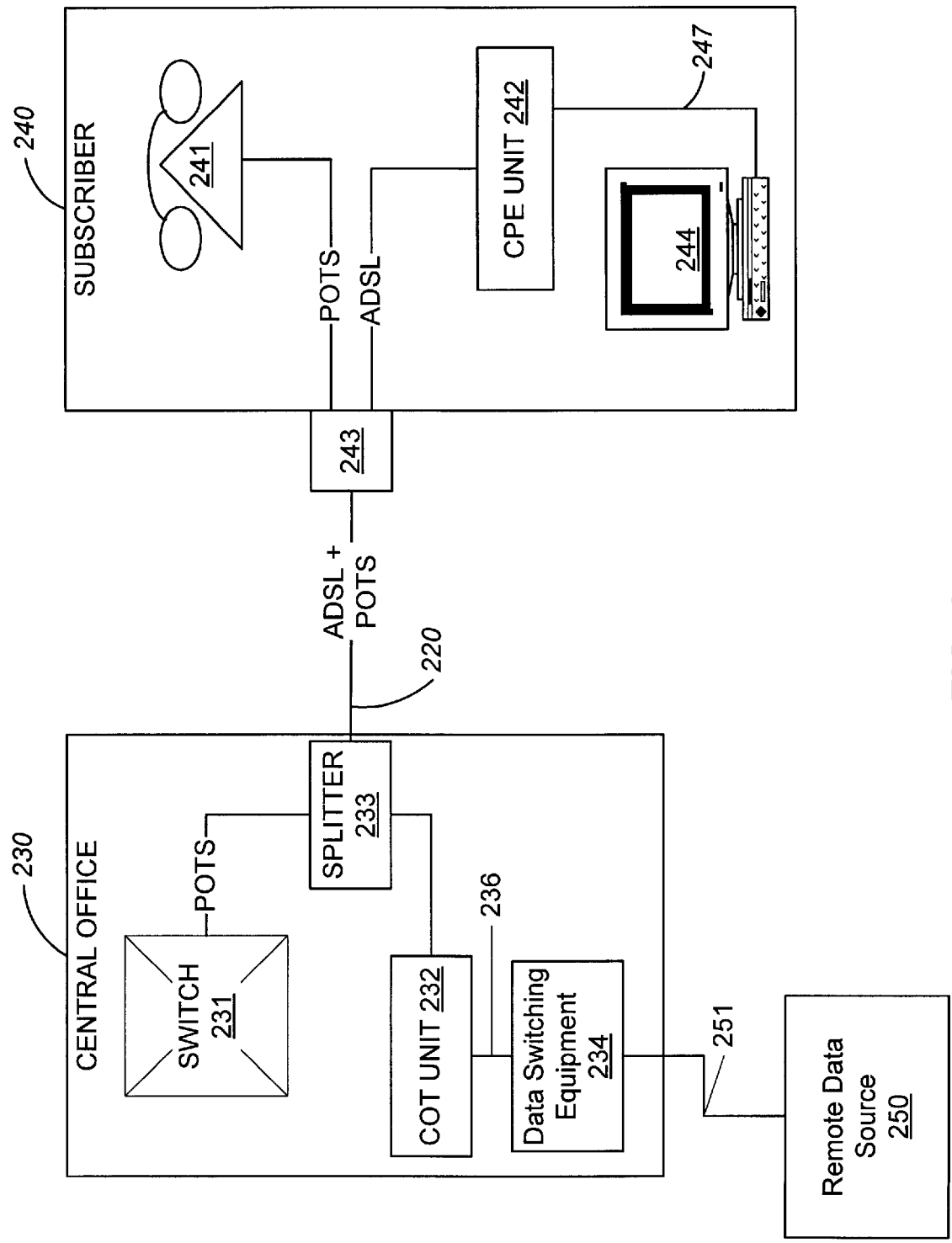
FIG. 2 is a diagram of a central office with a central office terminal (COT) ADSL unit connected by a two-wire loop to a customer premises equipment (CPE) ADSL unit in accordance with the invention.

To provision ADSL service, an ADSL unit 100 is located at each end of a wire loop 120. Referring to FIG. 2, an ADSL unit 100 located at the subscriber premises 240 is referred to as a customer premises equipment (CPE) ADSL unit 242. A second ADSL unit 100, typically located at a telephone company central office 230, is known as the central office terminal (COT) unit 232. The CPE unit and the COT unit are connected by a two-wire loop 220 of up to 18,000 feet.

Central office and customer premises equipment connects to the ADSL unit through a data interface 116 (FIG. 1). At the central office end of the loop 230, the data interface of the COT unit 232 is connected to central office data switching equipment 234. At the subscriber end of the loop 240, the data interface of the CPE unit 242 is connected to customer premise equipment such as a personal computer 244.

Data to be transmitted by an ADSL unit is arranged in a structure known as a 'frame' prior to being transmitted. A frame is an arrangement of bits including both user data and signaling information required by the ADSL units. When there is nothing to transmit between ADSL units, the user data portion of the frame may be filled with idle packets. Within the ADSL framing structure is a low bit rate signaling channel over which handshaking information can be exchanged between ADSL units. This signaling channel may be used, for example, to test the wire loop transmission path and to send ADSL device status information.

Circuitry within each ADSL unit 232 and 242 is used to remove noise, to perform error correction, to multiplex data, and to transmit and receive data. This is done without interfering with POTS audio and signaling transmissions over the two-wire loop 220, which uses spectrum below 4 kilohertz (kHz). Modulated data from the ADSL units 232 and 242 is transmitted using spectrum above 4 kHz, typically using a range of frequencies of 40 kHz and greater. Signal filters 233 and 243 (known as "splitters") are used to join signals being transmitted from one location, for example, the central office 230, and to separate signals when they are received at the distant location, for example, the customer premises 240.

Within the central office 230, a splitter 233 is used to combine outgoing signals from the POTS switching equipment 231 and the COT ADSL unit 232 for transmission on the loop 220. The splitter 233 also provides signals received on the two-wire loop 220 to both the POTS switching equipment 231 and to the COT ADSL unit 232. Signals to be sent to the POTS switching equipment 231 are filtered by the splitter 233 so as to remove frequencies above voiceband. The resulting filtered signal may be handled by the POTS switch 231 as if it had originated on a traditional analog POTS connection. The signal from the splitter 233 to the COT ADSL unit 232 may contain the full frequency spectrum as it arrives over the wire loop 220 or may be filtered to remove voice band frequencies.

At the customer premises 240, a splitter 243, which may serve as a telephone company network interface (NI) device, is used to combine outgoing signals from customer premises POTS-compatible equipment 241 and the CPE ADSL unit 242 for transmission on the loop 220. The splitter 243 is also used to direct signals received on the two-wire loop 220 to both customer premises POTS equipment 241, such as an analog telephone or a FAX machine, and to the CPE ADSL unit 242.

Signals to be sent to the customer premises POTS equipment 241 are filtered to remove frequencies above voice band. The resulting filtered signal may be handled by the customer premises POTS equipment 241 as if it had originated on a traditional analog POTS connection. The signal from the splitter 243 to the CPE ADSL unit 242 may contain the full frequency spectrum as it arrives over the wire loop 220 or it may be filtered to remove voiceband frequencies. The CPE ADSL unit 242 may be incorporated in, for example, an ADSL modem connected to a personal computer 244 that is programmed to send and receive over the ADSL connection. Circuitry to handle POTS and ADSL data functions may be combined within a single physical device handling signal splitting and filtering, POTS call processing and modulated data processing, transmitting, and receiving. Alternatively, these functions may be achieved using a number of physically separate devices.

Prior to initiating transport of modulated data over the loop 220, signals are exchanged over the loop 220 between the COT unit 232 and the CPE unit 242 to adapt the ADSL units to the electronic characteristics of the particular wire loop 220. For example, loop loss characteristics, which are a function of loop length, wire gauge, wire composition, and other factors, are exchanged. This exchange of information is often referred to as handshaking. Once handshaking is completed, transmission of user data may begin.

To reduce power requirements, the ADSL units 232 and 242 may enter low power mode when user data transmission is complete. Either unit may initiate the low power mode. If, for example, the CPE unit 242 initiates low power mode, it does so by sending a shut-down signal to the COT unit 232. This shut-down signal may be conveyed in the ADSL low bit rate signaling channel; alternatively, an out-of-band signal on the loop may be used, for example, a 16 kHz AC signal. Still another alternative is for the CPE unit to stop sending ADSL framing information (such as would happen if the CPE unit were powered down).

Upon receipt of the shut-down signal, the COT unit 232 optionally stores in memory 117 characteristics of the loop 220 that were determined by CPE to COT handshaking. Likewise, upon sending the shut-down signal, the CPE unit 242 may also optionally store the loop characteristics that it obtained through CPE to COT handshaking. Storing loop characteristics enables rapid resumption of user data transmission when the units are returned to full power mode. Each unit 232 and 242 may then enter low-power mode by shutting off the now unnecessary sections of signal processing 111, transmitting 112, and receiving 113 circuitry. The loop 220 will then be in an inactive state. Circuitry 115 to detect the resume signal must remain capable of signal detection during low power operation. If the COT unit 232 were to initiate low power mode, signals would be exchanged with the CPE unit 242 in a like fashion.

In alternative embodiments, both CPE 242 and COT 232 units may be capable of reduced power operation. Alternatively, only the COT 232 unit may reduce its power consumption, or only the CPE unit 242 may reduce its power consumption. If only the COT unit 232 is to reduce its power consumption, the COT unit 232 will not require resume signal generation 114 circuitry, nor will the CPE unit 242 require resume signal detection circuitry 115. Similarly, if only the CPE unit 242 is to reduce power consumption, the CPE unit 242 will not require resume signal generation 114 circuitry nor will the COT unit 232 require resume signal detection circuitry. Thus, the particular circuit components that can be placed in a low power mode may vary among differing brands, models, and versions of ADSL units.

To return a unit that is in low power mode to full power operation, a resume signal is sent to the unit. In one embodiment, a COT ADSL unit resumes full power operation upon receipt of a 16 kHz AC signal that is sent over the wire loop by a CPE ADSL unit. This resume signal may be detected by the COT unit using a 16 kHz AC signal detector 115 that employs conventional frequency detection techniques. This detector 115 remains operative when the unit 232 is in low-power mode. If the CPE unit 242 is capable of reduced power operation, a resume signal sent from the COT unit 232 to the CPE unit 242 would be similarly received at the customer premises and detected by the CPE unit 242.

Upon receipt of the resume signal, the receiving ADSL unit returns the signal processing 111, transmitting 112, and receiving 113 circuitry to full power mode. If loop transmission characteristics had been stored, these parameters are retrieved from memory 117 and used to enable data transmission to resume quickly by reducing the time needed to determine loop transmission characteristics. After resumption of full power mode, additional handshaking between ADSL units 232 and 242 may occur. Upon reaching a fully operational state, transmission of user data may resume.

Figure 3:
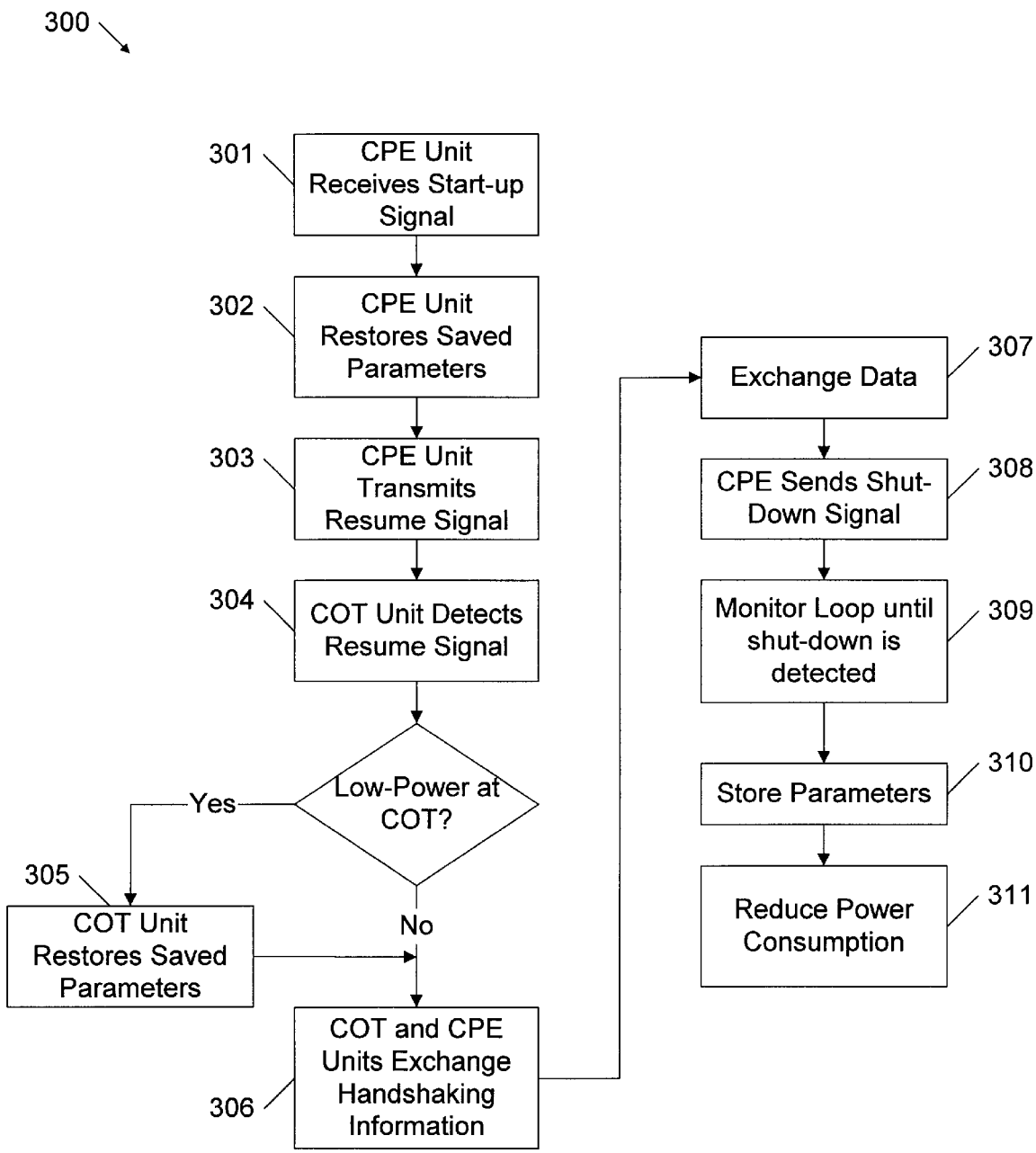
FIG. 3 is a flowchart of a data exchange between two connected ADSL units in accordance with the invention.

Referring to FIGS. 2 and 3, one exemplary application of the invention is to reduce power requirements needed to maintain a link between a personal computer (PC) 244 and a remote data source 250. The remote data source 250 may be, for example, an Internet service provider (ISP) or an online service provider (OSP). In an exemplary configuration, a CPE ADSL unit 242 is connected by a digital interface 247 to a personal computer 244 programmed to send and receive data over the ADSL unit 242. The CPE ADSL unit 242 may be incorporated in an ADSL modem that is installed in, or connected to, the PC 244. The CPE ADSL unit 242 is connected by a wire loop 220 to a COT ADSL unit 232 at a central office 230 at which a link to the remote data source 250 exists.

In the exemplary configuration, the wire loop 220 is initially inactive, thus preventing information flow between the CPE 242 and COT 232 ADSL units. To return the loop 220 to an active state, a start-up signal is sent to the CPE ADSL unit (step 301). The start-up signal is, for example, a command sent over the digital interface 247 from a device driver or other program module running in the PC 244 or may be represented by power to the CPE ADSL unit being turned on. Upon receipt of the start-up signal, the CPE ADSL unit may restore saved loop characteristic parameters (step 302). The CPE ADSL unit then transmits a 16 kHz resume signal on the loop (step 303) The resume signal is subsequently detected by loop monitoring circuitry in the COT unit (step 304). If the COT unit is in a low power state, it will return to full power operation upon detection of the resume signal from the CPE unit, this may include restoring loop characteristic parameters (step 305). If the COT unit was not in a low power state, the resume signal may be ignored by the COT unit. CPE and COT ADSL units may then exchange handshaking information to establish reliable data communication between the units (step 306). Handshaking information may be required where, for example, loop characteristics have changed due, for example, to temperature-dependent changes in loop resistance.

Handshaking information may also be exchanged for other device initialization purposes.

Once reliable data transmission from the CPE to the COT ADSL units is established, information may be exchanged over the established data path (step 307). Referring to FIG. 2, the personal computer 244 may use the data path between ADSL units to communicate with a remote data source by sending information over a digital interface 247 to the CPE ADSL unit 242. This digital interface may be an industry standard computer interface such as a small computer systems interface (SCSI), an Ethernet interface, or a peripheral component interconnect (PCI) interface, or other industry standard or vendor proprietary interfaces allowing two-way data exchange. Information from the PC to the CPE unit may include both user data and signaling information to control CPE ADSL unit operation or, by relaying such signaling over an ADSL to ADSL unit signaling channel, to control COT ADSL unit operation. User data provided to the CPE unit by the PC is transmitted to the COT unit over the established CPE to COT data transmission path.

Data received at the COT unit may be converted to a data signal format compatible with standard telephone company switching equipment, for example, a 1.544 million bits per second (Mbps) T1 data signal, or to asynchronous transfer mode (ATM) cells over an optical carrier level 3 (OC-3) synchronous optical network (SONET) interface. The received data, now in a central office equipment compatible format, may be provided over a standard telephony interface 236 to telephone company high speed data switching equipment 234, such as a digital cross connect switch or multiplexing equipment to a second interface 251 that connects to a remote data source 250. Alternatively, the data may flow from the COT ADSL unit 232 directly to the remote data source 250 without handling by intermediary switching equipment 234. Two way data transfers between the remote data source 250 and the PC 244 may then take place over the resulting path from PC 244 to CPE unit 242 to COT unit 232 to switching equipment 234 to remote data resource 250.

Referring again to FIG. 3, the COT unit may be returned to low power mode by sending a shut-down signal from the CPE unit to the COT unit (step 308). The shut-down signal may be an expressly transmitted signal or may be inferred. For example, the shut down signal may be expressly sent as a series of signaling bits transmitted between the CPE and COT ADSL units. Alternatively, if the PC and COT ADSL unit are shut off, a shut-down signal may be inferred from the loss of transmitted framing information between the CPE unit and the COT unit. The shut-down signal is subsequently detected by monitoring circuitry in the COT ADSL unit (step 309). Upon detecting a shut-down signal, the COT unit may save loop characteristics (step 310) and enter low power mode by reducing power to now unnecessary circuitry (step 311). The described procedure 300 may be repeated to resume data transmission. Essentially the same sequence may occur to reduce power at a CPE ADSL unit 242. A CPE ADSL unit may enter a low power mode when, for example, a preset or programmed period of time passes without any user activity on the data path or an appropriate signal is sent from the COT ADSL unit.

Other embodiments are within the scope of the following claims. For example, while the invention has been described in the context of ADSL units providing an asymmetric data channel, the invention may be applied to other terminal units wherein voice band services share a loop with modulated data transmission, such as in Symmetric Digital Subscriber Line (SDSL) and Rate Adaptive Digital Subscriber Line (RADSL) terminal units. Similarly, while systems with two-wire loops have been described, the invention may be used in systems including wireless loops and loop segments. Wakeup signals may include multi tone signals and other signals outside the POTS spectrum. Terminal unit circuitry may include digital circuitry, analog circuitry, software, firmware, or a combination of these elements. The scope of the invention should be limited only as set forth in the claims that follow.

What is claimed is:

1. A method of conserving power in a terminal unit having a transmitter and receiver for modulated data communication over a communications loop, comprising:
   monitoring the loop to detect a shut-down condition;
   reducing power consumption of demodulation circuitry in the terminal unit upon detection of a shut-down condition;
   monitoring the loop with a monitoring circuit to detect a resume signal that is not a modulated data signal and that is outside the voiceband frequency range on the loop; and
   activating demodulation circuitry when the resume signal is detected.

2. The method of claim 1 wherein modulated data comprises a bit stream including framing information, and a shut-down condition comprises a loss of framing information.

3. The method of claim 1 wherein modulated data comprises a bit frame including signaling bits and data bits and monitoring the loop to detect a shut-down condition comprises monitoring the signaling bits in the bit frame.

4. The method of claim 1 where the resume signal comprises a 16 kHz AC signal.

5. The method of claim 1 further comprising:
   storing loop characteristic parameters in a memory circuit upon detection of the shut-down condition; and
   transferring loop characteristic parameters from the memory circuit to the demodulation circuitry upon activating the demodulation circuitry.

6. The method of claim 5 further comprising performing handshaking to determine loop characteristics.

7. A modulated data transmitting and receiving unit, comprising:
   a connector operatively coupling the unit to a communications loop;
   first circuitry coupled to the connector to transmit and receive a modulated data signal in a frequency range above voiceband;
   memory circuitry operatively coupled to the first circuitry to store loop characteristic parameters in a low-power state and to transfer loop characteristic parameters to the first circuitry during a power up sequence; and
   second circuitry coupled to the connector to detect a resume signal in the frequency range above voiceband and then to initiate the power up sequence for the first circuitry.

8. The modulated data transmitting and receiving unit of claim 7 wherein the connector comprises a two-wire connector.

9. The modulated data transmitting and receiving unit of claim 7 wherein the first circuitry comprises asymmetric digital subscriber line data transmission circuitry.

10. The modulated data transmitting and receiving unit of claim 7 wherein the second circuitry comprises 16 kHz frequency detection circuitry.

11. The modulated data transmitting and receiving unit of claim 7 wherein the communications loop comprises a wireless communications loop.

12. The modulated data transmitting and receiving unit of claim 7 wherein the resume signal comprises an AC signal greater than 4 kHz.

13. The modulated data transmitting and receiving unit of claim 7 wherein the resume signal comprises transmission of an AC signal at a first frequency followed by transmission of an AC signal at a second frequency.

14. The modulated data transmitting and receiving unit of claim 6 further comprising:
   a control signal interface for receiving a start-up signal; and
   third circuitry coupled to the connector to transmit a resume signal on the loop upon receipt of a start-up signal on the control signal interface.

15. The apparatus of claim 7 wherein the first circuitry further comprises handshaking circuitry to determine loop characteristic parameters associated with the loop.

16. A modulated data transmitting and receiving unit, comprising:
   a connector operatively coupling the unit to a communications loop;
   a control signal interface for receiving a start-up signal;
   first circuitry coupled to the connector to transmit and receive a modulated data signal at frequencies above voiceband;

memory circuitry operatively coupled to the first circuitry to store loop characteristic parameters in a low-power state and to transfer loop characteristic parameters to the first circuitry upon receipt of a start-up signal on a control signal interface; and second circuitry coupled to the connector to transmit a resume signal on the loop upon receipt of the start-up signal on the control signal interface.

17. The modulated data transmitting and receiving unit of claim 16 wherein the communications loop comprises a two-wire communications loop.

18. The modulated data transmitting and receiving unit of claim 16 wherein the communications loop comprises a wireless communications loop.

19. The modulated data transmitting and receiving unit of claim 16 wherein the control signal interface comprises a data interface.

20. The modulated data transmitting and receiving unit of claim 19 wherein the data interface comprises a peripheral component interconnect (PCI) interface.

21. The modulated data transmitting and receiving unit of claim 19 wherein receipt of the start-up signal on the control signal interface comprises receipt of data on the control signal interface.

22. The modulated data transmitting and receiving unit of claim 16 wherein the control signal interface provides for exchange of a start-up signal and data between the modulated data transmitting and receiving unit and customer premise equipment.

23. The apparatus of claim 16 wherein the first circuitry further comprises handshaking circuitry to determine loop characteristic parameters associated with the loop.

24. A modulated data transmitting and receiving unit, comprising:

a connector operatively coupling the unit to a communications loop;

demodulator circuitry coupled to the connector to receive a modulated data signal on the loop;

power control circuitry coupled to the demodulator circuitry, the power control circuitry setting the demodulator circuitry in a reduced power state upon receipt of a low-power signal;

monitoring circuitry operatively coupled to the connector and to the power control circuitry, the monitoring circuitry being configured detect a shut-down condition on the loop and then to provide the low-power signal to the power control circuitry and the monitor circuitry further comprises detector circuitry to detect a resume signal that is not a modulated data signal and that is outside the voiceband frequency range, and then to initiate a demodulator circuitry power up sequence.

25. The apparatus of claim 24 further comprising memory circuitry coupled to the demodulator circuitry to store loop characteristic parameters when the demodulator circuitry is in a reduced power state.

26. The apparatus of claim 25 wherein the demodulator circuitry, the power control circuitry, and the memory circuitry comprise a single integrated circuit.

27. The apparatus of claim 24 wherein the detector circuitry comprises circuitry to detect an alternating current signal at a frequency above voiceband.

* * * * *

UNITED STATES PATENT AND TRADEMARK OFFICE
CERTIFICATE OF CORRECTION

| | | |
|---|---|---|
| PATENT NO. | : 5,956,323 | Page 1 of 1 |
| APPLICATION NO. | : 08/903504 | |
| DATED | : September 21, 1999 | |
| INVENTOR(S) | : Bruce H. Bowie | |

It is certified that error appears in the above-identified patent and that said Letters Patent is hereby corrected as shown below:

Column 8, line 50, "claim 6" should be changed to --claim 7--.

Signed and Sealed this

Twentieth Day of January, 2009

JON W. DUDAS
*Director of the United States Patent and Trademark Office*